United States Patent
Osborne et al.

(10) Patent No.: US 10,482,268 B1
(45) Date of Patent: Nov. 19, 2019

(54) SYSTEMS AND METHODS FOR ACCESS MANAGEMENT

(71) Applicant: Capital One Services, LLC, McLean, VA (US)

(72) Inventors: Jon Austin Osborne, Frisco, TX (US); Venkat Yashwanth Gunapati, Ashburn, VA (US); Amanda Juliene Rice, Plano, TX (US)

(*) Notice: Subject to any disclaimer, the term of this patent is extended or adjusted under 35 U.S.C. 154(b) by 0 days.

(21) Appl. No.: 16/058,741

(22) Filed: Aug. 8, 2018

(51) Int. Cl.
| | |
|---|---|
| *G06F 21/60* | (2013.01) |
| *G06F 21/62* | (2013.01) |
| *H04L 29/06* | (2006.01) |
| *G06F 21/55* | (2013.01) |
| *H04L 12/24* | (2006.01) |
| *G06N 5/00* | (2006.01) |

(52) U.S. Cl.
CPC ............ *G06F 21/604* (2013.01); *G06F 21/55* (2013.01); *G06F 21/6218* (2013.01); *G06N 5/003* (2013.01); *H04L 41/0893* (2013.01); *H04L 41/145* (2013.01); *H04L 63/102* (2013.01); *G06F 2221/2141* (2013.01)

(58) Field of Classification Search
CPC .......... G06F 21/55–552; G06F 21/604; G06F 21/6218–6281; G06F 2221/2141; G06N 5/003–006; G06N 5/02–027; G06N 5/04–048; H04L 41/0893; H04L 41/14–147; H04L 63/10–105; H04L 67/30–306
See application file for complete search history.

(56) References Cited

U.S. PATENT DOCUMENTS

| | | | | |
|---|---|---|---|---|
| 2008/0301141 | A1* | 12/2008 | Banjou | G06Q 10/10 |
| 2012/0246098 | A1* | 9/2012 | Chari | G06N 20/00 |
| | | | | 706/12 |
| 2013/0111583 | A1* | 5/2013 | Hernandez | G06F 21/6218 |
| | | | | 726/21 |

OTHER PUBLICATIONS

Austin Osborne et al., Using Machine Learning for User Access Management, Global Big Data Conference; Global Software Architecture Conference, Santa Clara, Jun. 9-11, 2017, slides 1-70.

* cited by examiner

*Primary Examiner* — Kevin Bechtel
(74) *Attorney, Agent, or Firm* — Finnegan, Henderson, Farabow, Garrett & Dunner, LLP

(57) ABSTRACT

Systems and methods are provided for access management using machine learning. An exemplary system may include at least one processor and a storage medium storing instructions that, when executed by the processor, cause the processor to perform operations. The operations may include obtaining user access information from an access directory and generating a network comprising nodes and edges. The nodes may include a first type of nodes representing users and a second type of nodes representing access rights. The edges may include a first type of edges indicating that users have access rights, and a second type of edges indicating degrees of similarity between two users. The operations may also include determining a group of nodes of the first type representing a community of users sharing a degree of commonality higher than a degree of commonality shared by other users outside the community.

20 Claims, 10 Drawing Sheets

SYSTEMS AND METHODS FOR ACCESS MANAGEMENT

TECHNICAL FIELD

The present disclosure relates generally to the field of access management using machine learning. More specifically, and without limitation, this disclosure relates to systems and methods for using machine learning techniques to detect communities of users based on the commonality of access rights granted to the users.

BACKGROUND

Members of an organization may use a wide range of technologies to facilitate a productive and efficient working environment. For example, various software and hardware resources may be used to develop new products. Such resources may include open source tools, cloud computing services, on-premises servers, data management tools, visualization tools, etc. Individual members (also referred to as users) may be granted access to one or more of these resources. Access management aims to manage the access rights for users across the organization. For organizations having a large number of users and/or resources, access management can be challenging.

One objective of effective access management is to grant a user access rights to those resources that are necessary or, to a lesser extent, useful, to complete the user's current project(s), while revoking the access rights to those resources that are no longer needed. Doing so would reduce the cost of maintaining excess resources, and also reduce the risks of a security breach stemming from those excess resources. However, it is difficult to ascertain which access rights should be maintained and which should be revoked on a user-by-user basis. For example, a user may be granted certain access rights during his/her involvement in a project. After the project concludes and the user is assigned to a new project, the user tends to keep those access rights, regardless of whether they are useful or even pertinent to the new project. Manual auditing of the access rights requires significant resources as well as deep understanding of the individual user's working habits, project requirements, etc., which may be impractical for large organizations having thousands or even tens of thousands of users.

Traditional access management methods rely heavily on organizational hierarchy. For example, individuals who belong to the same organizational unit or are managed by the same manager are usually assigned with the same or similar access rights. However, such methods become more and more problematic as users start collaborating with multiple teams at the same time. With multi-team collaborations, users within the same organizational unit may have vastly different sets of accesses. Therefore, the assumption that users in the same team should have similar access rights no longer holds.

Thus, there is a need for systems and methods capable of managing access rights based on analyzing the commonalities among different users' access rights, forming communities of users sharing similar access rights, and detecting anomalous access rights.

SUMMARY

In one aspect, a system is provided for access management using machine learning. The system may include at least one processor and a storage medium storing instructions that, when executed by the at least one processor, cause the at least one processor to perform operations. The operations may include obtaining user access information from an access directory. The operations may also include generating, based on the user access information, a network comprising nodes and edges. The nodes may include a first type of nodes representing users and a second type of nodes representing access rights. The edges may include a first type of edges connecting nodes of the first type and nodes of the second type. The first type of edges may indicate that users represented by nodes of the first type have access rights represented by nodes of the second type. The edges may also include a second type of edges connecting two nodes of the first type and indicating degrees of similarity between two users represented by the two nodes, based on a set of access rights of the two users. The operations may also include determining, from the network, a group of nodes of the first type. The group may represent a community of users sharing a degree of commonality higher than a degree of commonality shared by other users outside the community.

In another aspect, a computer-implemented method is provided for access management using machine learning. The method may include obtaining user access information from an access directory. The method may also include generating, based on the user access information, a network comprising nodes and edges. The nodes may include a first type of nodes representing users and a second type of nodes representing access rights. The edges may include a first type of edges connecting nodes of the first type and nodes of the second type. The first type of edges may indicate that users represented by nodes of the first type have access rights represented by nodes of the second type. The edges may also include a second type of edges connecting two nodes of the first type and indicating degrees of similarity between two users represented by the two nodes, based on a set of access rights of the two users. The method may also include determining, from the network, a group of nodes of the first type. The group may represent a community of users sharing a degree of commonality higher than a degree of commonality shared by other users outside the community.

In a further aspect, a non-transitory computer-readable medium is provided. The non-transitory computer-readable medium may store instructions executable by at least one processor to cause the at least one processor to perform operations for access management using machine learning. The operations may include obtaining user access information from an access directory. The operations may also include generating, based on the user access information, a network comprising nodes and edges. The nodes may include a first type of nodes representing users and a second type of nodes representing access rights. The edges may include a first type of edges connecting nodes of the first type and nodes of the second type. The first type of edges may indicate that users represented by nodes of the first type have access rights represented by nodes of the second type. The edges may also include a second type of edges connecting two nodes of the first type and indicating degrees of similarity between two users represented by the two nodes, based on a set of access rights of the two users. The operations may also include determining, from the network, a group of nodes of the first type. The group may represent a community of users sharing a degree of commonality higher than a degree of commonality shared by other users outside the community.

BRIEF DESCRIPTION OF THE DRAWINGS

The accompanying drawings, which are incorporated in and constitute a part of this specification, illustrate several embodiments and, together with the description, serve to explain the disclosed embodiments. In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

The present disclosure describes systems and methods for access management using machine learning. In some embodiments, an unsupervised machine learning algorithm, such as the Louvain Method for community detection, is used to detect a community of users sharing a certain degree of commonality. The commonality may be assessed based on the access rights granted to the users, with or without relying on the users' positions in their organizational hierarchy. After a community of users is segmented from the rest of the users, an anomalous access right granted to a user in the community can be detected when the access right is absent from a predetermined number of other users in that community. Based on the detection, recommendations or alerts can be generated identifying the anomalous access right.

Figure 1:
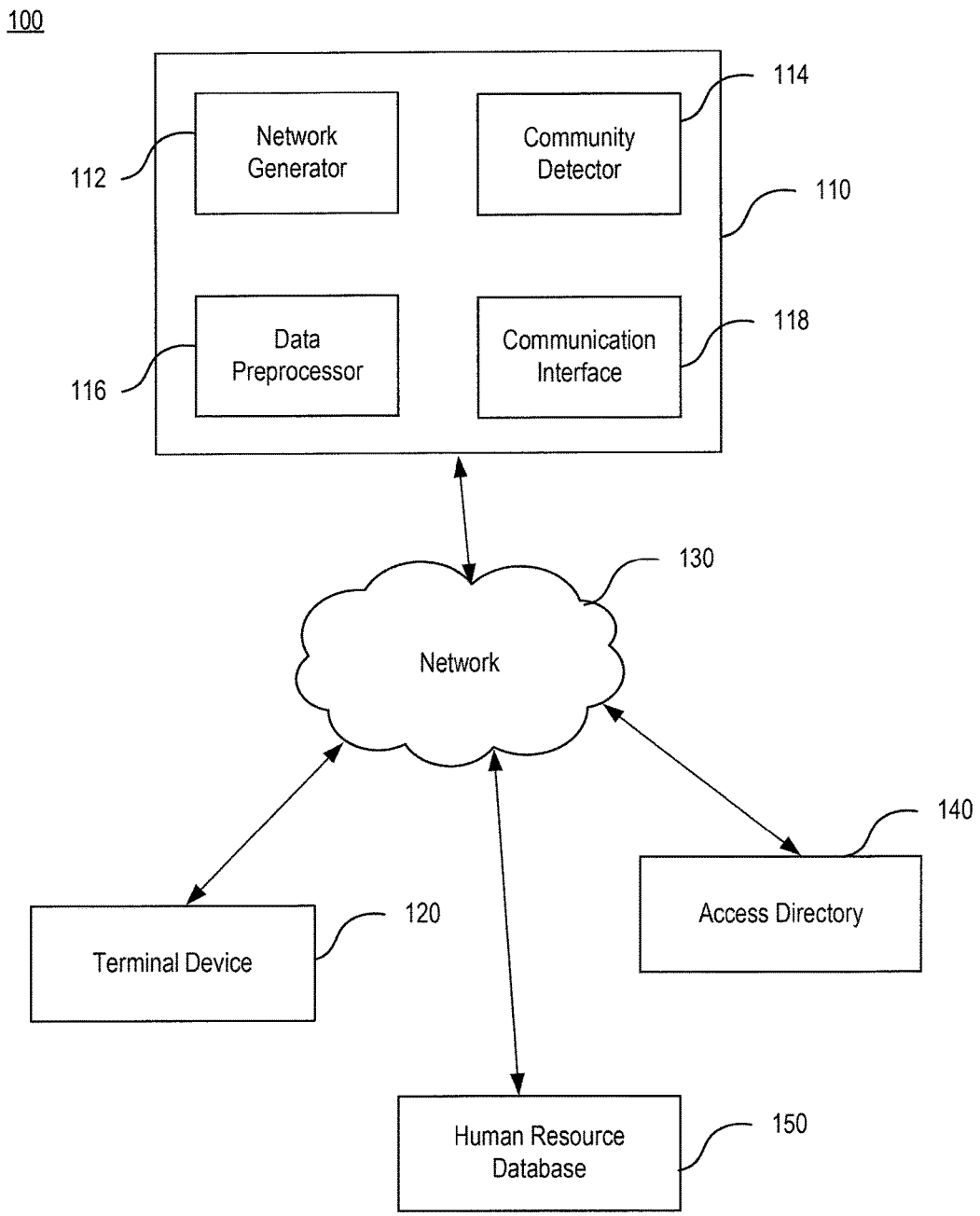
FIG. 1 is a block diagram of an exemplary access management system, consistent with the disclosed embodiments.

FIG. 1 shows a diagram of an exemplary system 100 configured to manage access rights, in which a machine-learning-based community detection method may be implemented, consistent with the disclosed embodiments.

As shown in FIG. 1, system 100 may include a computer system 110, a terminal device 120, a network 130, an access directory 140, and a human resource database 150. In some embodiments, terminal device 120, human resource database 150, and/or network 130 may be omitted. For example, computer system 110 may have direct access to access directory 140 without using network 130.

Computer system 110 may include any number of computers, including server and workstation computers. Computer system 110 may include one or more processors, including Central Processing Units (CPUs) that have a single core or multiple cores, Graphical Processing Units (GPUs), integrated circuits (ICs), chips, microprocessors, microcontrollers, Digital Signal Processors (DSPs), Field-Programmable Gate Arrays (FPGAs), or other types of processors. Computer system 110 may be organized in a centralized or distributed manner. Components of computer system 110 may be integrated or provided as discrete units or modules, and the components may be interconnected via a network.

Access directory 140 may include a database storing user access information. For example, access directory 140 may include an Active Directory storing user identifications and access rights granted to the users, among other information. In some embodiments, data stored in the Active Directory database may be organized in a certain format, such as in a comma-separated values ("CSV") file, where each user is represented in a row. Among the information contained in a row, a data field may be used to indicate a set of access rights granted to the user. Other ways to organize the Active Directory data may be used, and the systems and methods disclosed herein are not limited to the particular form of organizing the data.

Human resource database 150 may include such information as employment ID, name, job title, job level, organizational unit, manager, or other pertinent information for one or more users.

Terminal device 120 may include a computing device configured to perform operations consistent with the disclosed embodiments. For example, terminal device 120 may include at least one of a desktop computer, a laptop, a server, a mobile device (e.g., tablet, smart phone, etc.), a gaming device, a wearable computing device, or other type of computing device. Terminal device 120 may include one or more processors configured to execute software instructions stored in memory, such as memory included in terminal device 120. Terminal device 120 may include software that when executed by a processor performs network communication and content display processes. For instance, terminal device 120 may execute browser software that generates and displays interfaces including content on a display device included in, or connected to, terminal device 120. Terminal device 120 may execute applications that allow terminal device 120 to communicate with components of system 100 over network 130, and generate and display content in interfaces via a display device included in terminal device 120. The display device may be configured to display text, images, or videos relating to access management. The disclosed embodiments are not limited to any particular configuration of terminal device 120. For instance, terminal device 120 can be a mobile device that stores and executes mobile applications that interact with computer system 110, access directory 140, and/or human resource database 150 to perform aspects of the disclosed embodiments, such as managing accessing rights granted to users.

Network 130 may be any type of network configured to provide communications between components of system 100. For example, network 130 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In some embodiments, one or more components of system 100 can communicate through network 130. In various embodiments, one or more components of system 100 may communicate directly through one or more dedicated communication links.

As shown in FIG. 1, computer system 110 may include a network generator 112, a community detector 114, a data preprocessor 116, and a communication interface 118. Communication interface 118 may include any type of network adapter, such as an Ethernet adapter, a wireless network adapter, a fiber network adapter, etc., and may be configured to interface components of computer system 110 with terminal device 120, human resource database 150, and/or access directory 140, either directly or via network 130, such that components of computer system 110 may communicate with one or more of terminal device 120, human resource database 150, and/or access directory 140. For example, computer system 110 may access information stored in access directory 140 and/or human resource database 150 using communication interface 118.

Data preprocessor 116 may be configured to preprocess the user access information obtained from access directory 140 and/or human resource database 150 to organize the user access information in a proper format. In some embodiments, data preprocessor 116 may reformat the access directory data. For example, the access directory data may include a user information CSV file, with each user represented in a row. Within a row, there may be provided a data field, or a column, containing a pointer to an access right CSV file listing all access rights granted to a user. Data preprocessor 116 may merge the information contained in the access right CSV file with the information contained in the user information CSV file. For example, if a user has 45 access rights listed in the access right CSV, data preprocessor 116 may expand a single row in the user information CSV into 45 rows, with each row containing an individual access right.

Network generator 112 may be configured to generate a network comprising nodes and edges for community detection based on the user access information obtained from access directory 140 and/or human resource database 150, and optionally preprocessed by data preprocessor 116. Details regarding network generation will be discussed below. After network generator 112 generates the network, community detector 114 may detect a community of users based on commonalities in their access rights. For example, within an organization of 1000 users, a community of 20 users may be segmented from the rest of the users, where the 20 users within that community may share a degree of commonality higher than a degree of commonality shared by other users outside the community. In some embodiments, community detection may be performed using a subset of users in the organization. For example, a community of users may be detected out of a pool of users within a division, a department, or a project team, or managed by the same manager. Details regarding community detection will be discussed below.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
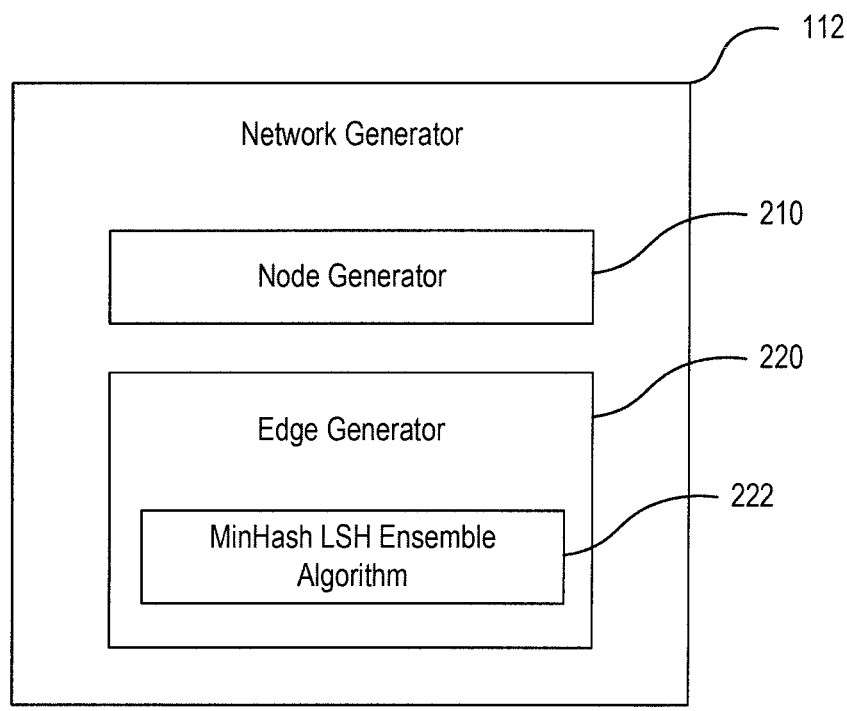
FIG. 2 is a block diagram of an exemplary network generator, consistent with the disclosed embodiments.

FIG. 2 is a functional block diagram showing exemplary components of network generator 112. Network generator 112 may be configured to generate a network for community detection. A network is a graphical representation of users, access rights, the relationships between the users and access rights, as well as the relationships among the users. As shown in FIG. 2, network generator 112 may include a node generator 210 and an edge generator 220. Node generator 210 may be configured to generate nodes in the network. A node may represent a user or an access right. Edge generator 220 may be configured to generate edges in the network. An edge may connect two nodes and may represent the relationship between the two nodes. In some exemplary embodiments, edge generator 220 may use a MinHash Locality-Sensitive Hashing (LSH) Ensemble algorithm 222 to generate edges in the network. Node generator 210 and edge generator 220 are described in greater detail below.

Figure 3:
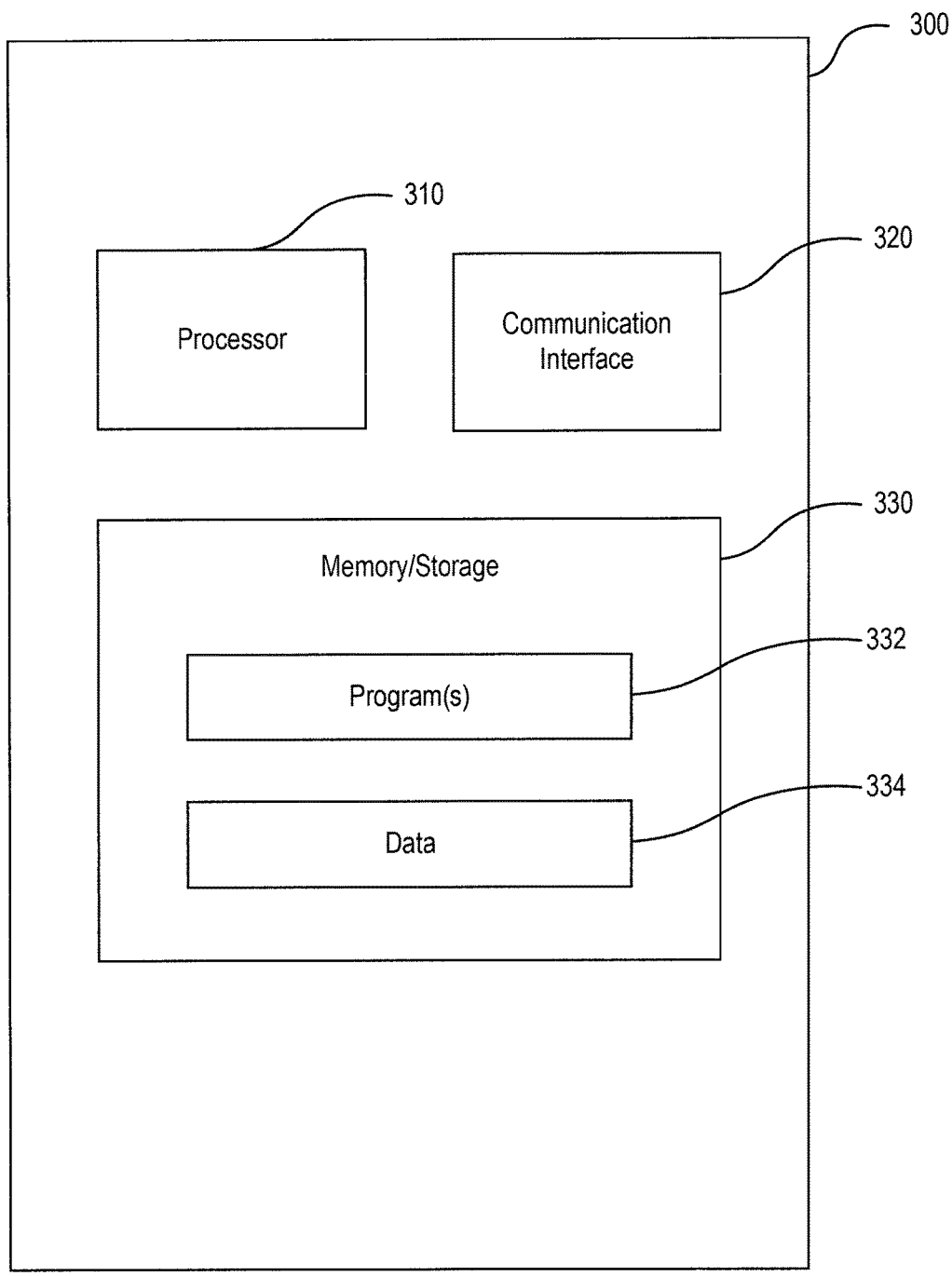
FIG. 3 is a block diagram of an exemplary computing system, consistent with the disclosed embodiments.

FIG. 3 shows a block diagram of an exemplary computing system 300 that may be associated with computer system 110 and/or terminal device 120, consistent with the disclosed embodiments.

In one embodiment, computing system 300 may include one or more processors 310, one or more memories or storage devices 330 (also referred to as memory/storage 330 or memory 330 for simplicity), and one or more communication interfaces 320. In some embodiments, computing system 300 may take the form of a server, specially programmed computer, mainframe computer, laptop, smartphone, mobile device, or any combination of these components. In certain embodiments, computing system 300 (or a system including computing system 300) may be configured as a particular apparatus, system, and the like based on the storage, execution, and/or implementation of the software instructions that perform operations consistent with the disclosed embodiments. Computing system 300 may be a standalone system, or it may be a subsystem, which may be part of a larger system.

Processor 310 may include any number of processing devices, such as a microprocessor, a CPU, a GPU, a DSP, an FPGA, etc. Processor 310 may constitute a single-core or multiple-core processor that executes parallel processes simultaneously. For example, processor 310 may be a single-core processor configured with virtual processing technologies. In certain embodiments, processor 310 may use logical processors to simultaneously execute and control multiple processes. Processor 310 may implement virtual machine technologies, or other known technologies to provide the ability to execute, control, run, manipulate, store, etc. multiple software processes, applications, programs, etc. In another embodiment, processor 310 may include a multiple-core processor arrangement (e.g., dual, quad core, etc.) configured to provide parallel processing functionalities to allow computing system 300 to execute multiple processes simultaneously. One of ordinary skill in the art would understand that other types of processor arrangements could be implemented that provide for the capabilities disclosed herein. The disclosed embodiments are not limited to any type of processor(s) configured in computing system 300.

Memory/storage 330 may include one or more storage devices configured to store instructions executable by processor 310 to perform operations associated with the disclosed embodiments. The disclosed embodiments are not limited to separate programs or computers configured to perform dedicated tasks. For example, memory/storage 330 may include a program 332 that performs the functions of computing system 300, or program 332 could comprise multiple programs. Additionally, processor 310 may execute one or more programs located remotely from computing system 300. For example, computer system 110 or terminal device 120 may, via computing system 300 (or variants thereof), access one or more remote programs that, when executed, perform functions related to certain disclosed embodiments. In some embodiments, programs 332 may be stored in an external storage device, such as a cloud server located outside of computing system 300, and processor 310 may execute programs 332 remotely.

Programs executed by processor 310 may cause processor 310 to execute operations for determining communities of users based on user access information using machine learning technologies, according to the disclosed embodiments.

Memory/storage 330 may also store data 334 that may reflect any type of information in any format that system 100 may use to perform operations consistent with the disclosed embodiments. Memory/storage 330 may store instructions to enable processor 310 to execute applications, such as server applications, network communication processes, and any other type of application or software, including software directed to managing user access rights according to the disclosed embodiments. Alternatively, the instructions, application programs, etc., may be stored in an external storage in communication with computing system 300 via network 130 or any other suitable network. Memory/storage 330 may be a volatile or non-volatile, magnetic, semiconductor (e.g., EEPROM, flash memory, etc.), tape, optical, removable, non-removable, or other type of storage device or tangible (i.e., non-transitory) computer-readable medium.

Processor 310, upon execution of programs 332, may perform the functionality of the disclosed embodiments for managing user access rights. In the disclosed embodiments, processor 310 may analyze user information and access right information to perform the disclosed functionality.

Communication interface 320 may include one or more devices configured to allow data to be received and/or transmitted by computing system 300. Communication interface 320 may include one or more digital and/or analog communication devices that allow computing system 300 to communicate with other machines and devices, such as other components of system 100 shown in FIG. 1. Computing system 300 may also include interface components for one or more input devices, such as keyboards, mouse devices, touch screens, and the like, which may enable computing system 300 to receive input from a user of computer system 110 (not shown).

As discussed above, computer system 110 may include at least one computing system 300. Further, although sometimes discussed here in relation to computer system 110, it should be understood that variations of computing system 300 may be implemented in other components of system 100, including terminal device 120. Computing system 300 may be a single server or may be configured as a distributed computer system including multiple servers or computers that interoperate to perform processes and functionalities associated with the disclosed embodiments.

Figure 4:
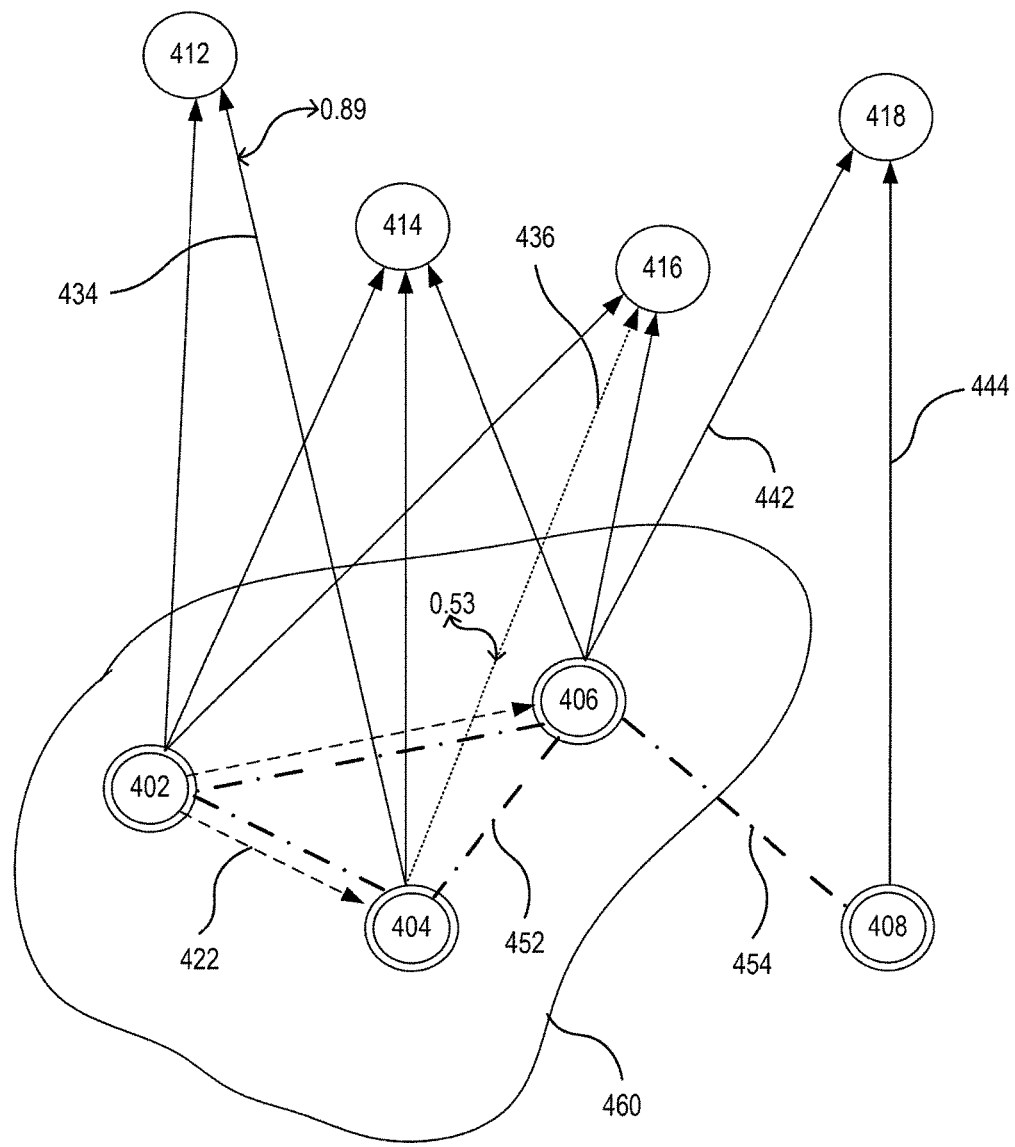
FIG. 4 is a graph showing an exemplary network for access management, consistent with the disclosed embodiments.

FIG. 4 illustrates an exemplary network 400 comprising nodes and edges for access management, according to the disclosed embodiments. Network 400 may be generated by network generator 112 based on user access information obtained from access directory 140 and/or human resource database 150. Network 400 may include a first type of nodes representing users, also referred to as user nodes. For example, nodes 402, 404, 406, and 408 shown in FIG. 4 may represent the first type of nodes representing four users. Network 400 may also include a second type of nodes representing access rights, also referred to as access nodes. For example, nodes 412, 414, 416, and 418 shown in FIG. 4 may represent the second type of nodes representing four kinds of access rights. In some embodiments, nodes in network 400 may be generated by node generator 210. For example, user information and access rights information (collectively referred to as user access information), may be obtained from access directory 140 and/or human resource database 150, preprocessed by data preprocessor 116, and provided to node generator 210. Node generator 210 may, based on the user access information, generate a set of records to represent users 402-408 and access rights 412-418 using a suitable data structure.

Nodes in network 400 may be interconnected by edges to represent relationships among the nodes. For example, FIG. 4 shows three types of edges. A first type of edges may connect user nodes and access nodes. For instance, line 434 connecting user node 404 and access node 412 may represent an edge of the first type, indicating that the user represented by user node 404 (also referred to as "user 404") "has" or "is granted" an access right 412. As used herein, an edge of the first type may also be referred to as an "HAS ACCESS" edge. Edge 434 may be a directional edge, represented by the arrow pointing from user node 404 to access node 412. Similarly, line 436 connecting user node 404 and access node 416 may represent another edge of the first type, representing that user 404 also has access right 416. Edge 436 may also be a directional edge, represented by the arrow pointing from user node 404 to access node 416. Other edges connecting user nodes and access nodes may also be edges of the first type, including edge 442 connecting user node 406 and access right 418 and edge 444 connecting user node 408 and access right 418. Similar to edges 434 and 436, other edges of the first type may be directional as well, represented by the arrows pointing from their respective user nodes to their respective access nodes.

The first type of edges may be generated by edge generator 220 based on user access information obtained from access directory 140 and/or human resource database 150. For example, edge generator 220 may generate edge 434 when user access information indicates that user 404 has access right 412. In some exemplary embodiments, user access information may be contained in a CSV file, in which each row includes identification information of a user and an access right granted to that user. Edge generator 220 may analyze the information contained in a row of the CSV file and generate an edge of the first type when the row indicates that a user has a particular access right.

In some embodiments, an edge of the first type, connecting a user node and an access node, may comprise a confidence parameter representing a likelihood that the user represented by the user node has the access right represented by the access node. For example, the confidence parameter may range from 0.0 to 1.0, with a higher value corresponding to a higher confidence level that the access right belongs to the user. For example, FIG. 4 shows an exemplary confidence parameter of edge 434, having a value of 0.89, and another exemplary confidence parameter of edge 436, having a value of 0.53. These confidence parameters indicate how likely the user represented by the user node (e.g., 404) has the respective access rights represented by the access nodes (e.g., 412 and 416). In this case, the values of the confidence parameters indicate that user 404 is more likely to have access right 412 than to have access right 416 (e.g., 0.89>0.53).

In some embodiments, a confidence parameter may be determined based on a prior result of community detection. For example, assuming a community of ten users is determined based on techniques described herein, a confidence parameter associated with a user within the community for a particular access right may be determined based on a ratio between the number of users within the community that have that access right and the total number of users within the community. For instance, if eight users within the community have an access right A, then the confidence parameter for a user within that community to have access right A may be calculated as 8/10=0.8. On the other hand, if only one user within the community has an access right B and no one else in the community has access right B, then the confidence parameter associated with an edge of the first type connecting that one user and access right B may be determined as 1/10=0.1.

In some embodiments, confidence parameters associated with edges of the first type may be determined iteratively and updated after a community detection process is finished. For example, when community detection is performed on a daily basis, confidence parameters may be updated on a daily basis (e.g., after every daily community detection process completes).

A second type of edges may connect two user nodes and indicate degrees of similarity between two users represented by the two user nodes. As used herein, an edge of the second type may also be referred to as a "SIMILAR_TO" edge. A degree of similarity may be determined based on a set of access rights of the two users. For example, FIG. 4 shows edges of the second type using dotted dash lines, including edge 452 connecting user nodes 404 and 406, and edge 454 connecting user nodes 406 and 408. An edge of the second type may be undirected, represented by lines without arrows, as shown in FIG. 4.

An edge of the second type may indicate that the two user nodes connected by the edge are similar to each other, based on the access rights assigned to them. In other words, when the set of access rights of one user is similar to the set of access rights of another user, an edge of the second type may be established between the two users. In some embodiments, an edge of the second type may be generated by edge generator 220 using a MinHash LSH Ensemble algorithm 222 based on a set of access rights of users. For example, edge generator 220 may determine the similarity between two user nodes based on their access rights. The similarity may be measured using a metric referred to as containment. The containment may represent a normalized quantity of access rights shared by both users normalized by a total number of access rights of either user. For example, referring to FIG. 4, user 402 has access to 412, 414, and 416, and user 406 has access to 414, 416, and 418, based on the edges of the first type associated with these two user nodes. To determine the containment, edge generator 220 may first determine the number of shared access rights, in this case 2 (i.e., 414 and 416). Then, edge generator 220 may determine the total number of access rights of either user 402 or 406, in this case 3. The containment can then be calculated as a normalized quantity, in this case 2/3. Edge generator 220 may compare the containment with a predetermined level, such as ½, to determine if users 402 and 406 are similar enough to establish an edge of the second type between them. If the containment is above the predetermined level, then edge generator 220 may generate an edge of the second type between user nodes 402 and 406. Otherwise, no edge of the second type may be generated between user nodes 402 and 406.

In some embodiments, to reduce the number of access rights (e.g., represented by edges of the first type) involved in the generation of edges of the second type, certain edges of the first type may be removed prior to the calculation of similarity between user nodes. For example, an edge of the first type having a confidence parameter lower than a predetermined value (e.g., 0.85) may be removed for the similarity calculation. Referring to FIG. 4, edge 436 is an edge of the first type, which has a confidence parameter of 0.53, indicating that the likelihood that access right 416 belongs to user 404 is relatively low (e.g., lower than a predetermined value of 0.85). Thus, in certain embodiments, edge 436 may be removed, as shown using a dotted line in FIG. 4.

In some embodiments, rather than removing an edge of the first type based on its confidence parameter, edge generator 220 may not generate such an edge to begin with. For example, before generating an edge of the first type, edge generator 220 may assess the confidence parameter associated with the edge. If the confidence parameter is higher than a predetermined value (e.g., 0.85), edge generator 220 may generate the edge. Otherwise, edge generator 220 may forego generating the edge.

A third type of edges may connect two user nodes and indicate that one user represented by the first user node manages the other user represented by the second user node. In other words, the third type of edges indicates hierarchical relationships between users. FIG. 4 shows edges of the third type using arrowed dash lines, including edge 422 connecting user nodes 402 and 404. An edge of the third type may be directed or directional, as shown by the arrows directing from the managing users to the managed users. For example, edge 422 may indicate that user 402 manages user 404.

The third type of edges may be generated by edge generator 220 using user access information obtained from human resource database 150. As described above, human resource database 150 may contain organizational charts or hierarchical information of users. Based on this information, edge generator 220 may generate edges of the third type connecting managing users and managed users.

In some embodiments, edges of the third type may be used to define a subset of users within an organization. For example, edge generation may be performed for users within the entire organization or within a subset of the organization, such as a division, department, project team, etc. As discussed in greater detail below, community detection may yield different results when the scope of analysis is different. For example, when the community detection is performed within a pool of all users within an organization, an individual user A may be in a community CA. When the community detection is performed within a smaller pool, for example within a department of the organization, user A may be in a community CB that is different from CA. That is, users included within CA may not be the same as users included within CB.

After edges of the second type are generated based on a pool of users, community detector 114 may analyze network 400 to detect a group of user nodes, representing a community of users sharing a degree of commonality higher than a degree of commonality shared by other users outside the community. For example, community detector 114 may use a machine learning algorithm such as the Louvain Method for community detection to detect the community. Using the Louvain Method, community detector 114 may determine the degree of commonality based on a modularity of at least a subset of the network, such as a pool of users defined based on edges of the third type, ranging from a project team to the entire organization. The modularity may represent a difference between a density of edges of the second type inside the community and a density of edges of the second type outside the community. For example, FIG. 4 shows a community 460 comprising users 402, 404, and 406, where the density of SIMILAR_TO edges (e.g., edge 452, the edge between user nodes 402 and 404, and the edge between user nodes 402 and 406) inside community 460 is higher, to a certain degree, than the density of SIMILAR_TO edges (e.g., edge 454) outside community 460. Community detector 114 may adjust a threshold of modularity to control the degree of commonality within a community. For example, if the threshold of modularity for forming a community is relatively high, users within the community may share a relatively higher degree of commonality. On the other hand, if the threshold of modularity for forming a community is relatively low, users within the community may share a relatively lower degree of commonality. For instance, referring to FIG. 4, assuming community 460 is detected based on a first modularity that has a relatively high value, such that user nodes 402, 404, and 406 are determined to be within community 460 while user node 408 is outside community 460. If, in another case, a second modularity having a relatively low value is used, then user node 408 may be determined to be within the same community as user nodes 402, 404, and 406, based on the SIMILAR_TO edge 454 between users nodes 408 and 406, although the commonality shared among all four user nodes: 402, 404, 406, and 408, may be relatively lower than the commonality shared among users nodes 402, 404, and 406.

In some embodiments, the Louvain Method may include two phases that are repeated iteratively. First, each node in the network may be assigned to its own community. Then, for each node i, the change in modularity is calculated for removing i from its own community and moving it into the community of each neighbor j of i. After the change in modularity is calculated for all communities i is connected to, i is placed into the community that resulted in the greatest modularity increase. If no increase is possible, i remains in its original community. This process can be applied repeatedly and sequentially to all nodes until no modularity increase can occur.

In the second phase, the algorithm may group all of the nodes in the same community and build a new network where nodes are the communities from the first phase. Any links between nodes of the same community can now be represented by self-loops on the new community node, and links from multiple nodes in the same community to a node in a different community can be represented by weighted edges between communities. After the new network is created, the second phase may end and the first phase can be re-applied to the new network.

After a community of users is determined, an anomalous access right granted to a user within the community can be detected. For example, an anomalous access right granted to a user within a community can be identified if the access right is absent from a predetermined number of users in the community to which the user belongs. Referring to FIG. 4, community 460 includes users 402, 404, and 406. User 406 has access to 418, which is absent from both 402 and 404. User 406's access to 418 may be identified as an anomalous access if, for example, the criteria for detecting an anomalous access is that the access right is absent from more than half of the users in the community. Computer system 110 may generate an alert or a recommendation and communicate the alert or recommendation to an operator of system 100 via, for example, terminal device 120. For example, computer system 110 may activate terminal device 120 and generate an alert indicating that an anomalous access is detected. In some exemplary embodiments, terminal device 120 may be in a sleep mode and computer system 100 may activate terminal device 120 after detecting an anomalous access. In some exemplary embodiments, manual confirmation may be required to remove a detected anomalous access.

The following processes are exemplary implementations of access management using machine learning, consistent with the disclosed embodiments. These processes may be performed by various aspects and components of system 100 and computing system 300, as is apparent from the disclosure.

Figure 5:
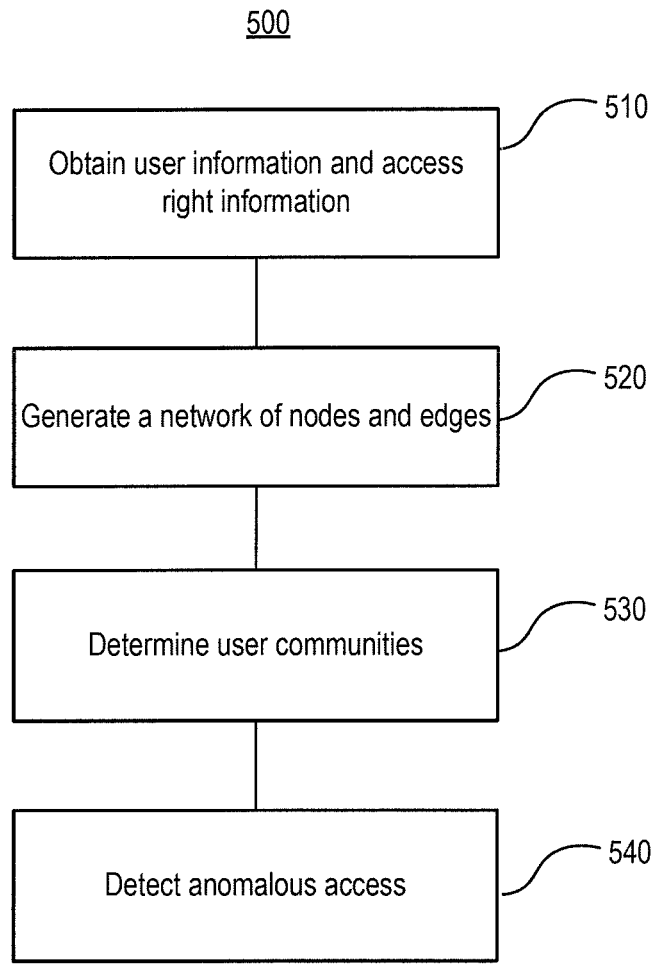
FIGS. 5-9 are flowcharts of exemplary processes for access management, consistent with the disclosed embodiments.

FIG. 5 is a flowchart of an exemplary process 500 for access management, consistent with the disclosed embodiments. In step 510, computer system 110 may obtain user information and access right information from access directory 140 and/or human resource database 150 using, for example, communication interface 118. As described above, the user information and access right information may be preprocessed by data preprocessor 116 according to certain data formats. The user information and access right information may collectively form user access information.

In step 520, network generator 112 may generate a network of nodes and edges based on the user access information, such as network 400 shown in FIG. 4. The nodes may include user nodes and access right nodes, as described above. Nodes can be interconnected with each other by edges, which may include three different types: the first type of edges connects a user node and an access right node, indicating the user is granted the access right; the second type of edges connects two user nodes, indicating that the two user nodes are similar to each other, based on the sets of access rights of both users; the third type of edges also connects two user nodes, indicating that one user manages the other user. Exemplary methods of generating the nodes and edges are described in detail above in connection with FIG. 4.

In step 530, community detector 114 may determine user communities based on the network generated in step 520. For example, the Louvain Method for community detection may be used to segment a group of users based on the relative density of edges (e.g., the second type of edges indicating similarity between two users) within and outside the community. Exemplary methods of community detection are described in detail above in connection with FIG. 4.

In step 540, computer system 110 may detect an anomalous access granted to a user based on the scarcity of such access within the community to which the user belongs. Exemplary methods of anomalous access detection are described in detail above in connection with FIG. 4.

Figure 6:
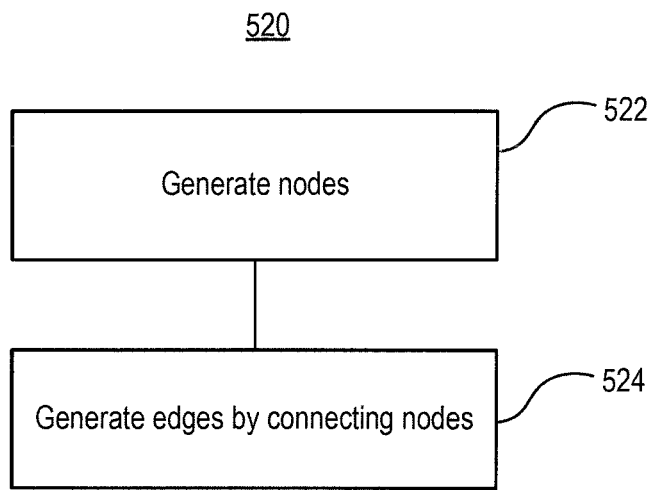

FIG. 6 is a flow chart of an exemplary implementation of step 520, consistent with the disclosed embodiments. As shown in FIG. 6, step 520 may further include steps 522 and 524. In step 522, node generator 210 may generate nodes (e.g., user nodes and access nodes) based on user access information obtained from access directory 140 and/or human resource database 150, and optionally preprocessed by data preprocessor 116, as described above in connection with FIGS. 2 and 4. In step 524, edge generator 220 may generate edges by connecting nodes. For example, edge generator 220 may generate the first type of edges by connecting user nodes and access nodes, the second type of edges by connecting user nodes, and the third type of edges by connecting user nodes, as described above in connection with FIGS. 2 and 4.

Figure 7:
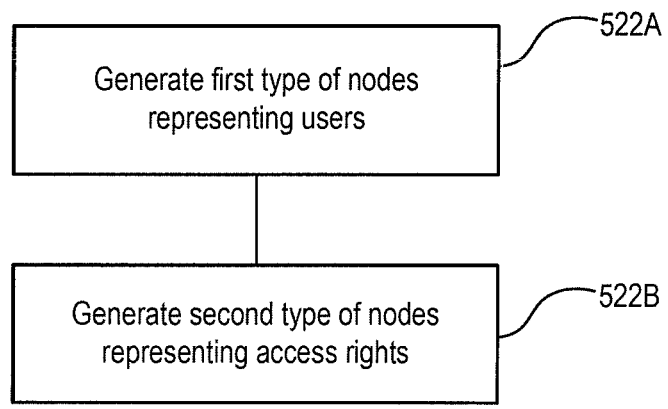

FIG. 7 is a flow chart of an exemplary implementation of step 522, consistent with the disclosed embodiments. As shown in FIG. 7, step 522 may further comprise steps 522A and 522B. In step 522A, node generator 210 may generate the first type of nodes representing users, such as user nodes 402, 404, 406, and 408 shown in FIG. 4. In step 522B, node generator 210 may generate the second type of nodes representing access rights, such as access nodes 412, 414, 416, and 418 shown in FIG. 4.

Figure 8:
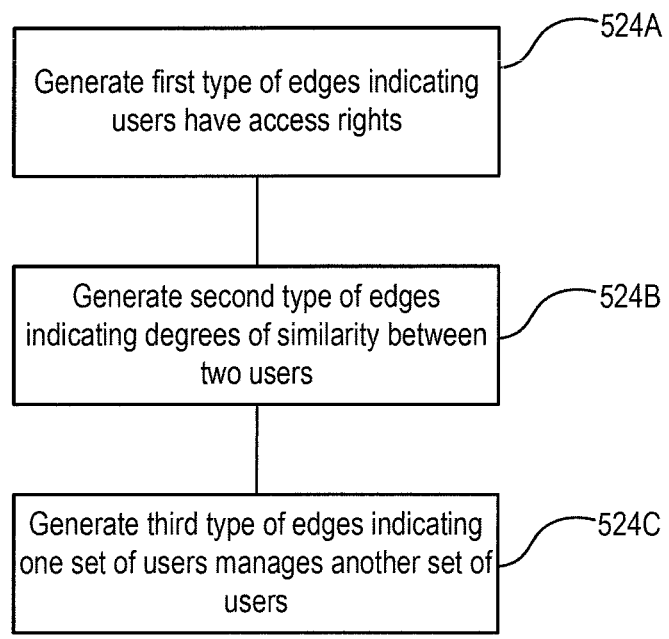

FIG. 8 is a flow chart of an exemplary implementation of step 524, consistent with the disclosed embodiments. As shown in FIG. 8, step 524 may further comprise steps 524A, 524B, and 524C. In step 524A, edge generator 220 may generate the first type of edges indicating users have access rights, such as edges 434, 436, 442, and 444 shown in FIG. 4. In step 524B, edge generator 220 may generate the second type of edges indicating degrees of similarity between two users, such as edge 452 shown in FIG. 4. In step 524C, edge generator 220 may generate the third type of edges indicating one set of users manages another set of users, such as edge 422 shown in FIG. 4.

Figure 9:
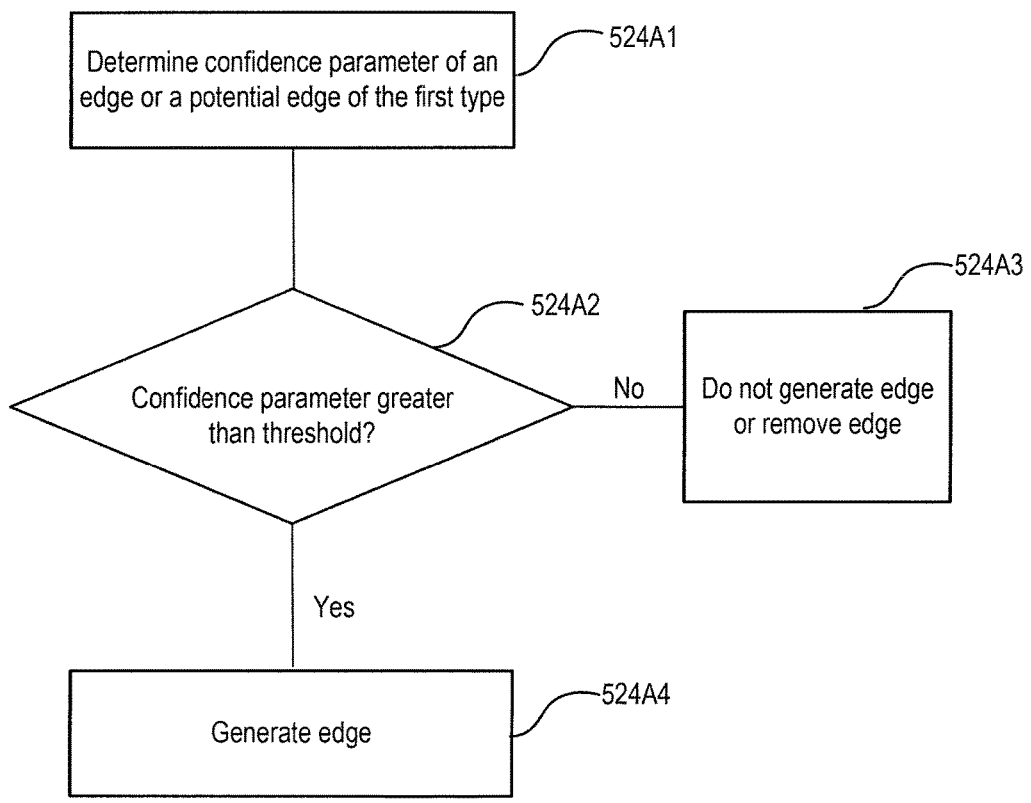

FIG. 9 is a flow chart of an exemplary implementation of step 524A, consistent with the disclosed embodiments. As shown in FIG. 9, step 524A may further comprise steps 524A1, 524A2, 524A3, and 524A4. In step 524A1, edge generator 220 may determine a confidence parameter of an edge or a potential edge of the first type. As described above, the confidence parameter may indicate the likelihood that a user represented by a node of the first type has the access right represented by a node of the second type. For example, FIG. 4 shows a confidence parameter 0.89 for edge 434 and another confidence parameter 0.53 for edge 436. In step 524A2, edge generator 220 may determine if the confidence parameter of an edge or potential edge is greater than a predetermined threshold. If so, the process proceeds to step 524A4, in which edge generator 220 may generate the edge. If not, the process proceeds to step 524A3, in which edge generator 220 may not generate the edge or may remove the edge if the edge has been generated.

Figure 10:
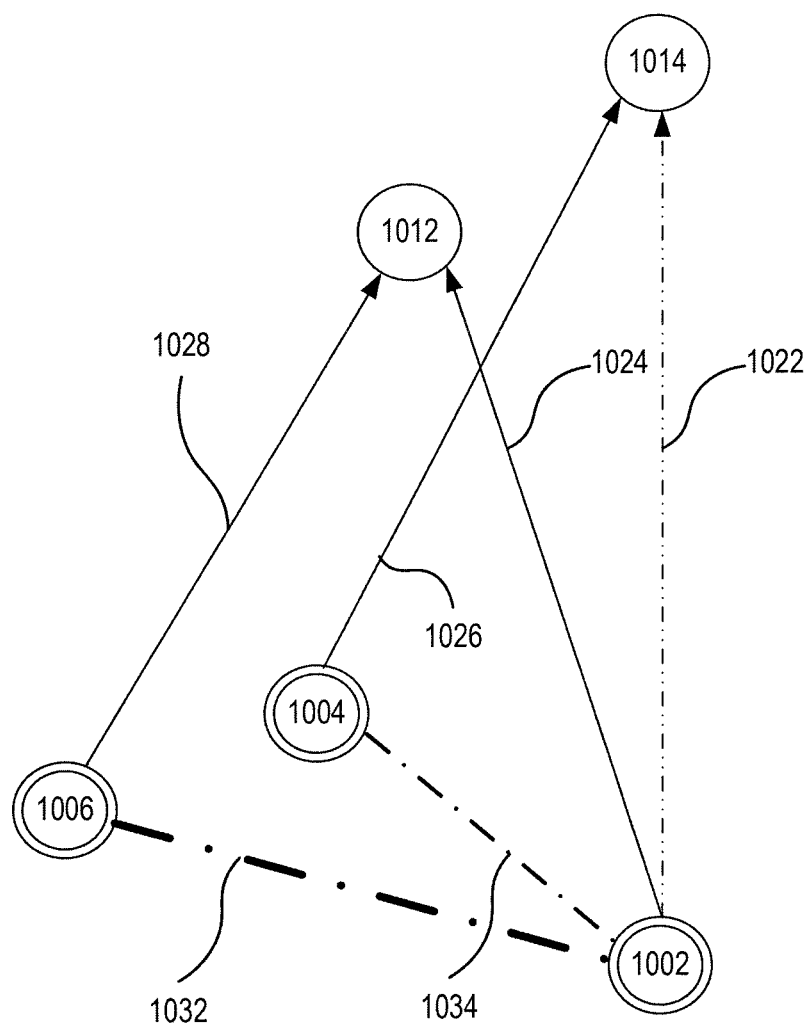
FIG. 10 is a graph showing another exemplary network for access management, consistent with the disclosed embodiments.

FIG. 10 shows an exemplary network 1000 for managing access rights based on temporal parameters, consistent with the disclosed embodiments. A temporal parameter may indicate the age of a certain access right granted to a user. In some embodiments, more recently granted access rights may weigh heavier in determining similarities among user nodes than older access rights. In some embodiments, taking recency into consideration may improve the accuracy of community detection.

Referring to FIG. 10, nodes 1002, 1004, and 1006 are user nodes, while nodes 1012 and 1014 are access nodes. Edges 1022, 1024, 1026, and 1028 are of the first type, indicating that user 1002 has access rights 1014 and 1012, user 1004 has access right 1014, and user 1006 has access right 1012, respectively. At least one of edges 1022, 1024, 1026, and 1028 may comprise a temporal parameter representing a time period since the user connected by the edge(s) was granted the access right indicated by the edge(s). For example, edge 1022, shown in dash line in FIG. 10, may comprise a temporal parameter, which may indicate that user 1002 was granted access right 1014 a long time ago. The temporal parameter of edge 1022 may weigh edge 1022 to a lighter extent when calculating the similarities among users 1002, 1004, and 1006. For example, while users 1002 and 1006 both share access right 1012, and users 1002 and 1004 both share access right 1014, edge generator 220 may determine that users 1002 and 1006 have a higher degree of similarity than users 1002 and 1004, where edge 1032 of the second type connecting user nodes 1002 and 1006 is shown to be thicker than edge 1034 of the second type connecting user nodes 1002 and 1004.

The community detection techniques disclosed herein are not limited to access management and can be used in other applications. For example, network 400 can be generalized by replacing user nodes with elements nodes and replacing access right nodes with feature nodes. In other words, the community detection techniques disclosed herein can be applicable to segment a community of elements based on a set of features the elements have. For instance, the elements may comprise cloud computing events and the features may comprise properties of the cloud computing events. In another example, the elements may comprise financial product customers and the features may comprise financial-related behaviors of the customers. In yet another example, the elements may comprise entertainment products and the features may comprise classification information such as genres, popularity, user feedback, etc. In yet another example, the elements may comprise social network users and the features may comprise activities of the users, social connections of the users, etc. In any of these applications, the community detection techniques disclosed herein may be used to segment a community of elements based on the commonality of their features and may detect anomalous features based on the community.

The above-described processes may be implemented as a computer program or application or as a plugin module or sub-component of another application. Some of the described processes may be executed by computing system 300 as part of system 100. The described techniques may be varied and are not limited to the examples or descriptions provided.

Systems and methods disclosed herein may improve the functionality of computer system 110 or terminal device 120. For example, the use of the MinHash LSH Ensemble algorithm can improve the speed with which the SIMILAR_TO edges can be generated, the use of the confidence parameters as thresholding measures can reduce the computation cost, and the use of the Louvain Method for community detection can improve the efficiency of community detection. Alternatively, these methods may help reduce an amount of storage either during processing or after.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which are non-exclusive. For example, aspects of the disclosed embodiments are described as being associated with data stored in memory, and one skilled in the art will appreciate that these aspects can be stored on and executed from many types of tangible computer-readable media, such as secondary storage devices, like hard disks, floppy disks, or CD-ROM, or other forms of RAM or ROM. Accordingly, the disclosed embodiments are not limited to the above described examples but instead are defined by the appended claims in light of their full scope of equivalents.

The invention claimed is:

1. A system for access management using machine learning, the system comprising:
   at least one processor; and
   a storage device storing instructions that, when executed by the at least one processor, cause the at least one processor to perform operations comprising:

obtaining user information and access right information from an access directory and a database;

preprocessing the obtained user information and access right information into user access information, wherein the user access information comprises at least a combination of the user information and the access right information;

generating, based on the user access information, a network for community determination comprising nodes and edges, wherein:

the nodes comprise:

a first type of nodes representing users based on the preprocessed user access information; and a second type of nodes representing access rights based on the preprocessed user access information; the edges comprise:

a first type of edges connecting nodes of the first type and nodes of the second type, the first type of edges comprising a confidence parameter indicating a likelihood that users represented by nodes of the first type have access rights represented by nodes of the second type, wherein the confidence parameter is computed based on a ratio between a number of users within a prior result of a community determination that have that access right and a total number of users within the prior result of the community determination; and a second type of edges connecting two nodes of the first type and indicating degrees of similarity between two users represented by the two nodes, based on a set of access rights of the two users, wherein the degrees of similarity is based on the access right information; and determining, using an unsupervised machine learning algorithm, from the generated network for community determination, and from the user information, a group of nodes of the first type, the group representing a community of users sharing a degree of commonality higher than a degree of commonality shared by other users outside the community.

2. The system of claim 1, wherein the operations comprise:

determining the group of nodes of the first type using a Louvain Method for community detection; and determining the degree of commonality based on a modularity of at least a subset of the network, the modularity representing a difference between a density of edges of the second type inside the community and a density of edges of the second type outside the community.

3. The system of claim 1, wherein the edges comprise a third type of edges, the third type of edges:

connecting first nodes of the first type and second nodes of the first type; and indicating that first users represented by the first nodes of the first type manage second users represented by the second nodes of the first type.

4. The system of claim 1, wherein the confidence parameter is updated.

5. The system of claim 4, wherein the operations comprise:

generating at least one edge of the first type that has the confidence parameter higher than a predetermined value.

6. The system of claim 4, wherein the operations comprise:

removing at least one edge of the first type that has the confidence parameter lower than a predetermined value.

7. The system of claim 1, wherein the operations comprise:

generating, using a Min Hash LSH Ensemble algorithm, edges of the second type based on a set of access rights of users.

8. The system of claim 1, wherein the operations comprise:

generating an edge of the second type between a first node of the first type and a second node of the first type when a containment between the first and second node is above a predetermined level, the containment representing a normalized quantity of access rights shared by both a first user represented by the first node and a second user represented by the second node, normalized by a total number of access rights of either the first or second user.

9. The system of claim 1, wherein:

at least one edge of the first type comprises a temporal parameter representing a time period since the user represented by the node of the first type was granted the access right represented by the node of the second type; and the operations comprise generating an edge of the second type based on the temporal parameter, wherein a shorter time period weighs heavier than a longer time period in determining the degree of similarity.

10. The system of claim 1, wherein the operations comprise:

detecting an anomalous access right granted to a user when the anomalous access right is absent from a predetermined number of users in the community to which the user belongs.

11. A computer-implemented method for access management using machine learning, the method comprising:

obtaining user information and access right information from an access directory and a database;

preprocessing the obtained user information and access right information into user access information, wherein the user access information comprises at least a combination of the user information and the access right information;

generating, based on the user access information, a network for community determination comprising nodes and edges, wherein:

the nodes comprise:

a first type of nodes representing users based on the preprocessed user access information; and a second type of nodes representing access rights based on the preprocessed user access information; the edges comprise:

a first type of edges connecting nodes of the first type and nodes of the second type, the first type of edges comprising a confidence parameter indicating a likelihood that users represented by nodes of the first type have access rights represented by nodes of the second type, wherein the confidence parameter is computed based on a ratio between a number of users within a prior result of a community determination that have that access right and a total number of users within the prior result of the community determination; and a second type of edges connecting two nodes of the first type and indicating degrees of similarity between two users represented by the two nodes, based on a set of access rights of the two users, wherein the degrees of similarity is based on the access right information; and determining, using an unsupervised machine learning algorithm, from the generated network for community determination, and from the user information, a group of nodes of the first type, the group representing a community of users sharing a degree of commonality higher than a degree of commonality shared by other users outside the community.

12. The method of claim 11, comprising:
determining the group of nodes of the first type using a Louvain Method for community detection; and
determining the degree of commonality based on a modularity of at least a subset of the network, the modularity representing a difference between a density of edges of the second type inside the community and a density of edges of the second type outside the community.

13. The method of claim 11, wherein the edges comprise a third type of edges, the third type of edges:
connecting first nodes of the first type and second nodes of the first type; and
indicating that first users represented by the first nodes of the first type manage second users represented by the second nodes of the first type.

14. The method of claim 11, wherein the confidence parameter is updated.

15. The method of claim 14, comprising:
generating at least one edge of the first type that has the confidence parameter higher than a predetermined value.

16. The method of claim 14, comprising:
removing at least one edge of the first type that has the confidence parameter lower than a predetermined value.

17. The method of claim 11, comprising:
generating an edge of the second type between a first node of the first type and a second node of the first type when a containment between the first and second node is above a predetermined level, the containment representing a normalized quantity of access rights shared by both a first user represented by the first node and a second user represented by the second node, normalized by a total number of access rights of either the first or second user.

18. The method of claim 11, wherein:
at least one edge of the first type comprises a temporal parameter representing a time period since the user represented by the node of the first type was granted the access right represented by the node of the second type; and
the method comprises generating an edge of the second type based on the temporal parameter, wherein a shorter time period weighs heavier than a longer time period in determining the degree of similarity.

19. The method of claim 11, comprising:
detecting an anomalous access right granted to a user when the anomalous access right is absent from a predetermined number of users in the community to which the user belongs.

20. A non-transitory computer-readable medium storing instructions executable by at least one processor to cause the at least one processor to perform operations for access management using machine learning, the operations comprising:

obtaining user information and access right information from an access directory and a database;
preprocessing the obtained user information and access right information into user access information, wherein the user access information comprises at least a combination of the user information and the access right information;
generating, based on the user access information, a network for community determination comprising nodes and edges, wherein:
the nodes comprise:
a first type of nodes representing users based on the preprocessed user access information; and
a second type of nodes representing access rights based on the preprocessed user access information; the edges comprise:
a first type of edges connecting nodes of the first type and nodes of the second type, the first type of edges comprising a confidence parameter indicating a likelihood that users represented by nodes of the first type have access rights represented by nodes of the second type, wherein the confidence parameter is computed based on a ratio between a number of users within a prior result of a community determination that have that access right and a total number of users within the prior result of the community determination; and
a second type of edges connecting two nodes of the first type and indicating degrees of similarity between two users represented by the two nodes, based on a set of access rights of the two users, wherein the degrees of similarity is based on the access right information; and
determining, using an unsupervised machine learning algorithm, from the generated network for community determination, and from the user information, a group of nodes of the first type, the group representing a community of users sharing a degree of commonality higher than a degree of commonality shared by other users outside the community.

* * * * *